United States Patent
Kinebuchi et al.

(10) Patent No.: US 12,292,889 B2
(45) Date of Patent: May 6, 2025

(54) PROGRAMMABLE DATA LAYER FOR GRAPHICAL USER INTERFACES

(71) Applicant: Twilio Inc., San Francisco, CA (US)

(72) Inventors: Kentaro Kinebuchi, San Francisco, CA (US); Andrea Zornada, San Francisco, CA (US); Ryan Kennedy, San Francisco, CA (US); Ajey Shah, San Francisco, CA (US)

(73) Assignee: Twilio Inc., San Francisco, CA (US)

( * ) Notice: Subject to any disclaimer, the term of this patent is extended or adjusted under 35 U.S.C. 154(b) by 0 days.

(21) Appl. No.: 18/198,747

(22) Filed: May 17, 2023

(65) Prior Publication Data
US 2024/0386018 A1  Nov. 21, 2024

(51) Int. Cl.
*G06F 16/2455* (2019.01)
*G06F 16/2453* (2019.01)

(52) U.S. Cl.
CPC .. *G06F 16/24556* (2019.01); *G06F 16/24542* (2019.01)

(58) Field of Classification Search
CPC ............ G06F 16/24556; G06F 16/24542
See application file for complete search history.

(56) References Cited

U.S. PATENT DOCUMENTS

| | | | | |
|---|---|---|---|---|
| 7,895,568 B1 * | 2/2011 | Goodwin | ............... | G06Q 10/10 717/107 |
| 8,751,464 B1 * | 6/2014 | Weiss | ..................... | G06Q 10/10 707/695 |
| 11,665,268 B2 * | 5/2023 | Shankar | ..................... | G06F 9/54 719/328 |
| 11,960,459 B1 * | 4/2024 | Jonsson | ............... | G06F 16/258 707/695 |
| 2009/0024652 A1 * | 1/2009 | Thompson | ............ | G06F 16/252 707/999.102 |
| 2014/0143724 A1 * | 5/2014 | Picard | ................... | G06T 11/206 715/828 |
| 2014/0281909 A1 * | 9/2014 | Pinto | ................... | G06F 9/45529 707/810 |
| 2021/0248114 A1 * | 8/2021 | Tamjidi | ............... | G06F 16/2433 707/810 |
| 2021/0294679 A1 * | 9/2021 | Thakur | ................... | G06F 8/315 707/810 |
| 2022/0138048 A1 * | 5/2022 | Yelheri | ................. | G06F 3/0667 707/649 |
| 2023/0199117 A1 * | 6/2023 | Koul | .................... | H04M 3/5183 379/201.01 |

* cited by examiner

*Primary Examiner* — Yuk Ting Choi
(74) *Attorney, Agent, or Firm* — Schwegman Lundberg & Woessner, P.A.

(57) ABSTRACT

A method of providing support at a server for GUI development is disclosed. At least a portion of a query is received from the client system. It is determined that a first field of a plurality of fields corresponding to a specified custom object type is to be resolved using a data item stored in a first server-side data store of the plurality of server-side data stores. It is determined that a second field of the plurality of fields corresponding to the specified custom object type is to be resolved using a data item stored in a second server-side data store of the plurality of server-side data stores. The data item stored in the first server-side data store is aggregated with the data item stored in the second server-side data store into a response to at least a portion of a query for sending to a client system.

20 Claims, 20 Drawing Sheets

```
import {
  useAionDataModel,
  useAionMutation,
  gql,
  InvitesList,
} from '@twilio/aion-components';

const INVITES_LIST_QUERY = gql`
  query InvitesList {
    invitesList {
      sid
      channelSid
      channelType
      friendlyName
    }
  }
`;
```

FIG. 4A

```
export const InteractionsList = ( ): JSX.Element => {
  const { data, loading, error } = useAionDataModel<InvitesList>(INVITES_LIST_QUERY);
```

FIG. 4B

```
export const InteractionsList = ( ): JSX.Element => {
  const { data, loading, error } =
    useAionDataModel<InvitesList>(INVITES_LIST_QUERY);

IF (loading) {
    return <div>loading...</div>;
  }
  if (error) {
    return <div>Something went wrong</div>;
  } if (!data ?. invitesList ?. length) {
    return <div>No Invites</div>;
  } return (
    <div className="cardWrapper">
      <h2>My Interactions</h2>
      {data.invitesList.map((inviteList) => (
        <div className="card" key={inviteList.sid}>
          <h3>{inviteList.friendlyName}</h3>
          <p>{inviteList.sid}</p>
          <p>channel: {inviteList.channelType}</p>
          <div className="cardActions">
            <button
              type="button"
              onClick={ ( ) => handleAcceptInvite(inviteList.sid)}
            >
              Accept
            </button>
            <button type="button">Reject</button>
          </div>
        </div>
      ))}
    </div>
  );
};
```

FIG. 5

```
function useQuery<TData = any, TVariables = OperationVariables>(
    query: DocumentNode,
    options?: QueryHookOptions<TDara, TVariables>,
): QueryResult<TData, TVariables> {} function useMutation<TData = any, TVariables = OperationVariables>(
    mutation: DocumentNode,
    options?: MutationHookOptions<TDara, TVariables>,
): MutationTuple<TData, TVariables> {} function useFlexSubscription<TData = any, TVariables = OperationVariables>(
    subscription: DocumentNode,
    options?: SubscriptionHookOptions<TDara, TVariables>,
): SubscriptionTuple<TData, TVariables> {}
```

FIG. 6

LANDBOX | https://xxxx | xxxx

Schema Reference SDL

We recently added the ability to filter your Scheme Reference.
We would love to hear your feedback.

← Object types

AccesInvitePayload

[ Invite ]

▽ Filter Scheme

All Return Types  -    All Arguments  -                    8 Filters

Invite
Kind of type Object

Filter                                                  Open in xxxxxxxx channelSid: String!         xx xxxxxxxx channelType: String!        xx xxxxxxxx dateCreated: String!        xx xxxxxxxx friendlyName: String!       xx xxxxxxxx InteractionSid: String!     xx xxxxxxxx xx xxxxxxxx xxxxxx xxxxxxxxx

| Entity | Data Source | | | | Data Stitching | | | |
|---|---|---|---|---|---|---|---|---|
| | Phase 1 | Transition | Phase 2 | Phase 3 | Phase 1 | Transition | Phase 2 | Phase 3 |
| Interactions List<br>● For a user<br>● Logic involves filtering interactions based on the user being a participant in the interactian's channel events | FDV/Sync<br>- interactionParticipant added event to add to list<br>- It is never removed | FDV/Sync | GraphQL Server<br>- Source= Interactions API | GraphQL Server | SDK | UDL from the SDK UDL needs to call deconstructed SDK APIs so that it can switch the data. | UDL from the SDK and GraphQL Server. UDL needs to call SDK APIs and in addition the SDK needs to support a resolver for GraphQL server calls. | GraphQL Server |
| InteractionsView<br>● detail Interacion<br>● contains array of channel media events with media_sids | FDV/Sync | FDV/Sync | GraphQL Server<br>-Interactions<br>-Interaction Chanels<br>-<br>Interaction Channel Participants | GraphQL Server<br>-Interactions<br>-Interaction Chanels<br>-<br>Interaction Channel Participants<br>-Topics | FDV SDK | UDL from the SDK Sources: FDV, CustomerProvie, etc | GraphQL Server | GraphQL Server |

FIG. 11

| Feature | C1 | C2 | C3 | C4 | C5 | C6 | C7 | C8 |
|---|---|---|---|---|---|---|---|---|
| • contains array of channel participants with particpant_sids | | | | | | | | |
| ChannelMedia Events<br>• messages, call events<br>• stitching based on media_sids | SDK (conversations SDK, Voice) using FDV as a base (channel media sid) | SDK | SDK | GraphQL Server | SDK | SDK | SDK | GraphQL Server |
| ChannelEvents Participants<br>• conversations, calls, etc | SDK (Users SDK, Conversations SDK, customer profiles) | SDK (Users SDK, Conversations SDK, customer profiles) | SDK (Users SDK, Conversations SDK, customer profiles) | GraphQL Server | SDK (Customer Profile, Users) | SDK (Customer Profile, Users) | SDK (Customer Profile, Users) | GraphQL Server |
| Invites List<br>• Customer Profile, Interaction | FDV/Sync | FDV/Sync | GraphQL Server | GraphQL Server | FDV | FDV | GraphQL Server | GraphQL Server |
| Topics | SDK | SDK | SDK | GraphQL Server | SDK | SDK | SDK | GraphQL Server |

FIG. 11 (Continued)

| API | Phase 1 | Transition | Phase 2 | Phase 3 |
|---|---|---|---|---|
| Interaction.start OutboundVoice() | 'Observable' from the SDK interactionObservable. startOutboundVoice() | API on the SDK await voiceController.start OutboundVoice(interaction_sid,fram,to) | API on the SDK Same as Transition | API on the SDK Same as Transition |
| Accept Invite POST /Invite | invite.acceptInvite() Calls Conductor | API on the SDK await interactionsController.accept (invite_sid) | API on the SDK Same as Transition | API on the SDK Same as Transition |
| invite.rejectInvite() | invite.rejectInvite() | API on the SDK await interactionsController.reject (invite_sid) | API on the SDK Same as Transition | API on the SDK Same as Transition |
| interaction.getChannel() | Observable from the SDK: interactionObservable. getChannel() | GraphQL | GraphQL | GraphQL |

FIG. 12A

| UI Components | Data Sources |
| --- | --- |
| Interactions List | FDV InteractionsList / InteractionAPI<br>FDV InteractionView / InteractionsAPI<br>Topics API<br>Customer Profile API<br>Conversations SDK / API |
| Invites List | FDV InvitesList / Invites API<br>FDV InteractionView<br>Topics API<br>Customer Profile API |
| Comms Canvas | FDV InteractionView / InteractionsAPI<br>Topics API<br>Customer Profile API<br>Users API<br>Conversations SDK / API |

FIG. 12B

```
select * from Invites
where
    serviceInstance = 'AIxxxx'
    userSid = 'USxxxx' and
    (invite.state= 'OFFERED' or invite.state = 'ACCEPTED')
```

FIG. 14

```
select Interactions.Sid from Interactions
    inner join Channels on Interaction.sid=Channel.interactionSid
    inner join Participants on Channel.sid=Participant.channelSid
where
    interaction.serviceInstance = 'AIxxxx' and
    participant.userSid = 'USxxxx'
```

FIG. 15

Home loan application
1m 12s * 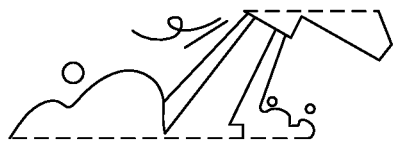 +
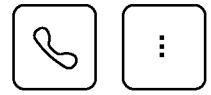
New Interaction
Home loan application
started today at 9.06am
SMS conversation
started at 9.08am
FIG. 16

```
InteractionView:
{
  sid: string;
  status: InteractionStatus;
  dateCreated: string;
  channels: Channels[ ];

customer: InteractionEndCustomer;
  users: Users[ ];
  Topics: Topic[ ];

eventsList: InteractionChannelEvent[ ];
}

// this represents Messages, Emails, Voice Events, time events
InteractionChannelEvent {
  key: string;
  index: number;
  body: string;
  channelSid: string;
  channelType: ChannelType;
  particiapantIdentifier: string;
  participantSid: string;
  participantType: ParticipantType;
  dateCreated: Date;
 }
}
```

FIG. 17

PROGRAMMABLE DATA LAYER FOR GRAPHICAL USER INTERFACES

TECHNICAL FIELD

The disclosed subject matter relates generally to the technical field of cloud-based software-as-service (SaaS) architectures and, in one specific example, to a programmable data layer for graphical user interfaces.

BACKGROUND

Software developer or engineers may use various tools to develop software applications, including tools for developing graphical user interfaces (GUIs) for those software applications. Unfortunately, developing GUIs using such tools often requires detailed knowledge of one or more software development kits (SDKs), such as SDKs that provide GUI components and/or interaction logic upon which the GUI is based. Thus, it can be difficult for a software developer or engineer to quickly implement a GUI using a new SDK that the software developer or engineer is not familiar with.

BRIEF DESCRIPTION OF THE DRAWINGS

Some embodiments are illustrated by way of example and not limitation in the figures of the accompanying drawings.

FIG. 4A is an example pseudo code listing for defining an operation.

FIG. 4B is an example pseudo code listing for hydrating a user interface component with data.

FIG. 5 is an example pseudo code listing for implementing logic for a user interface.

FIG. 6 is an example pseudo code listing for functions for using queries, using mutations, and using subscriptions.

FIG. 7 is a screenshot of an example user interface for viewing the API.

FIG. 8 is an example user interface for viewing documentation, viewing or defining an operation, and/or viewing a response to a query.

FIG. 11 is a table describing an example Omnichannel Data Model.

FIG. 12A is a table describing example Omnichannel APIs on the SDK.

FIG. 12B is a table describing example Omnichannel GUI sources.

FIG. 14 is a pseudo code showing an example query of selecting from the invites list.

FIG. 15 is pseudo code showing an example query for selecting an interactions identifier.

FIG. 16 is a screenshot of an example communications canvas GUI component.

FIG. 17 is a pseudo code listing of an Interaction View object.

DETAILED DESCRIPTION

Figure 1:
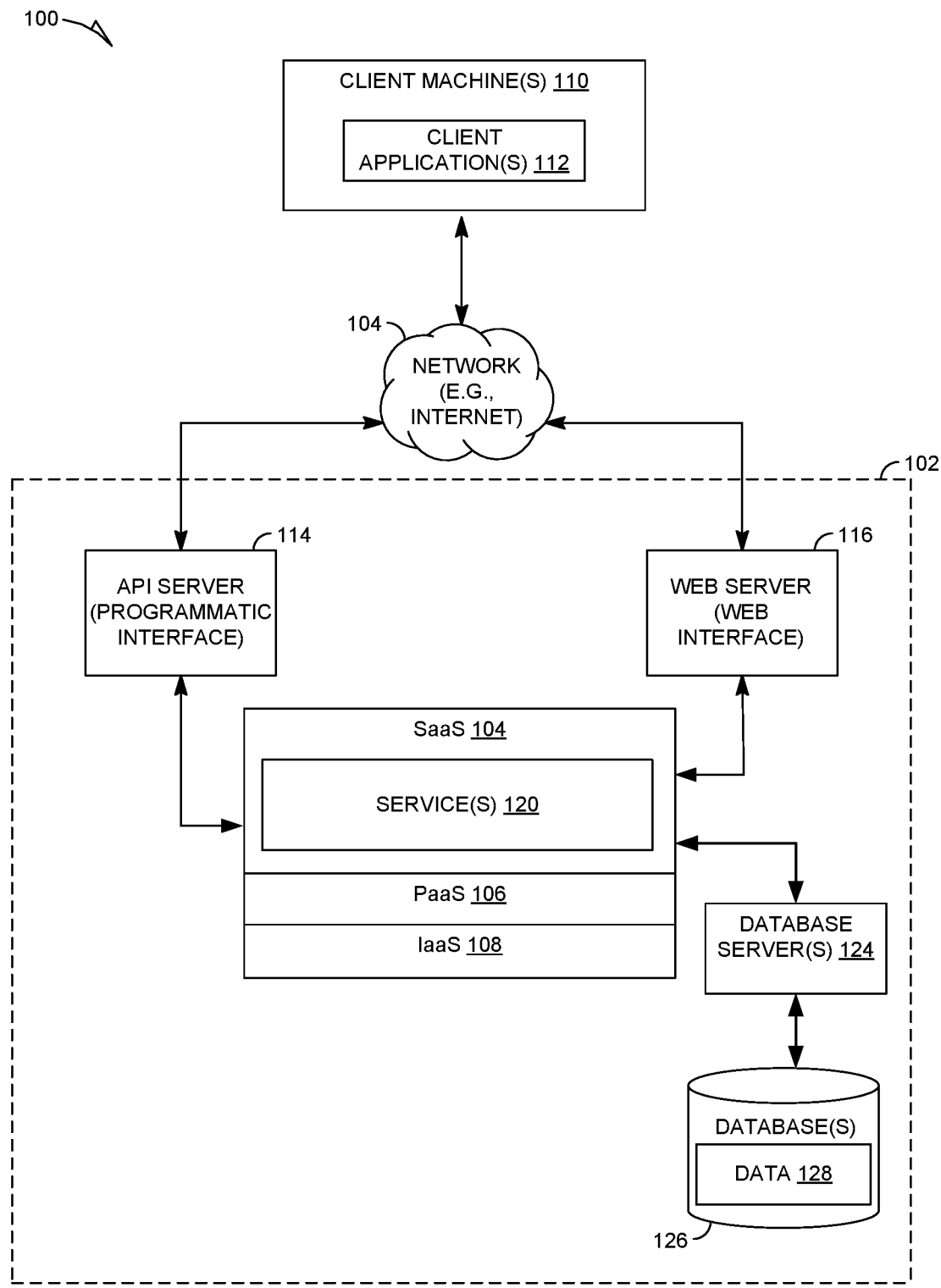
FIG. 1 is a network diagram depicting a cloud-based SaaS system within which various example embodiments may be deployed.

In the following description, for purposes of explanation, numerous specific details are set forth in order to provide an understanding of various embodiments of the present subject matter. It will be evident, however, to those skilled in the art that various embodiments may be practiced without these specific details.

A system, including a software development kit (SDK) (e.g., also referred to herein as "the system" or "the service(s)"), is disclosed that allows a user, such as a software developer, engineer, or programmer, to quickly develop a GUI for an application, such as a contact center application, without having detailed knowledge of the GUI components supported by the SDK and/or interaction logic supported by the SDK.

The SDK includes a GUI data layer that allows the user to submit a declarative ask for one or more data items, build out presentation GUI components, and/or implement GUI and interaction logic. In example embodiments, a GUI data layer interface is automatically generated from SDK type definitions. In example embodiments, the GUI data layer uses the SKD under the hood to perform one or more operations that the GUI components require.

The GUI Data Layer is configured to solve the problem of a user having to understand the SDK, including how to wire up state dependencies between components and/or how to customize components. In example embodiments, a user can use the system or operations described herein to create an application, such as a contact center application, without having to learn the SDK (e.g., because no SDK-specific coding is required). In example embodiments, the user can consume the GUI features of the SDK using a query language (e.g., GraphQL) in conjunction with a front-end user interface library (e.g., React).

In example embodiments, documentation for the GUI data layer is automatically generated from one or more SDK type definitions and/or one or more API contracts are dictated directly by the SDK. Thus, in example embodiments, users get interactive API documentation out of the box and/or can explore the entire shape of the API and/or interact with the API (e.g., using a mocked version of the backend).

In example embodiments, one or more values corresponding to one or more data fields are requested (e.g., from a client application). The one or more data fields may be stored in a communication system and/or one or more systems external from the communication system, such as one or more customer data platform (CDP) systems, one or more customer relationship management (CRM) systems (e.g., Salesforce), one or more information technology service management (ITSM) systems (e.g., ServiceNow), or one or more enterprise resource planning (ERP) systems.

In example embodiments, a method of providing support at a server for GUI development is disclosed. A schema definition is generated from a plurality of server-side application programming interfaces (APIs). Each of the server-side APIs corresponds to a different server-side data store of a plurality of server-side data stores. The schema definition defines a hierarchy of supported types. The hierarchy of supported types includes one or more custom object types. Each of the one or more custom object types having a plurality of fields. The schema definition is provided to a client system. At least a portion of a query is received from the client system. The at least the portion of the query is built according to the schema definition and/or specifies a custom object type of the one or more custom object types. It is determined that a first field of the plurality of fields corresponding to the specified custom object type is to be resolved using a data item stored in a first server-side data store of the plurality of server-side data stores. The determining to resolve the first field is based on an accessing of a first server-side resolver, the first server-side resolver associated with the first field. It is determined that a second field of the plurality of fields corresponding to the specified custom object type is to be resolved using a data item stored in a second server-side data store of the plurality of server-side data stores. The determining to resolve the second field is based on an accessing of a second server-side resolver. The second server-side resolver associated with the second field. The data item stored in the first server-side data store is aggregated with the data item stored in the second server-side data store into a response to the at least the portion of the query for sending to the client system.

In example embodiments, a method of implementing a GUI on a client disclosed. A schema definition is received from a server. The schema definition is generated from a plurality of server-side application programming interfaces (APIs). Each of the server-side APIs corresponds to a different server-side data store of a plurality of server-side data stores. The schema definition defines a hierarchy of supported types. The hierarchy of supported types includes one or more custom object types. Each of the one or more custom object types has a plurality of fields. A query is built according to the schema definition. The query specifies a custom object type of the one or more custom object types. It is determined that a first field of the plurality of fields corresponding to the specified custom object type is to be resolved using a data item stored in a client-side data store. The determining to resolve the first field is based on an accessing of a first client-side resolver, the first client-side resolver associated with the first field. It is determined that a second field of the plurality of fields corresponding to the specified custom object type is to be resolved using a data item stored in a server-side data store of the plurality of server-side data stores. The determining to resolve the second field is based on an accessing of a second client-side resolver. The second client-side resolver is associated with the second field. The data item stored in the client-side data store is aggregated with the data item stored in the server-side data store into a response to the query for processing by the client system.

FIG. 1 is a network diagram depicting a system 100 within which various example embodiments may be deployed. A networked system 102, in the example form of a cloud computing service, such as Microsoft Azure or other cloud service, provides server-side functionality, via a network 104 (e.g., the Internet or Wide Area Network (WAN)) to one or more endpoints (e.g., client machines 110). FIG. 1 illustrates client application(s) 112 on the client machines 110. Examples of client application(s) 112 may include a web browser application, such as the Internet Explorer browser developed by Microsoft Corporation of Redmond, Washington or other applications supported by an operating system of the device, such as applications supported by Windows, iOS or Android operating systems. Each of the client application(s) 112 may include a software application module (e.g., a plug-in, add-in, or macro) that adds a specific service or feature to the application.

An API server 114 and a web server 116 are coupled to, and provide programmatic and web interfaces respectively to, one or more software services, which may be hosted on a software-as-a-service (SaaS) layer or platform 104. The SaaS platform may be part of a service-oriented architecture, being stacked upon a platform-as-a-service (PaaS) layer 106 which, may be, in turn, stacked upon a infrastructure-as-a-service (IaaS) layer 108 (e.g., in accordance with standards defined by the National Institute of Standards and Technology (NIST)).

While the applications (e.g., service(s)) 120 are shown in FIG. 1 to form part of the networked system 102, in alternative embodiments, the applications 120 may form part of a service that is separate and distinct from the networked system 102.

Further, while the system 100 shown in FIG. 1 employs a cloud-based architecture, various embodiments are, of course, not limited to such an architecture, and could equally well find application in a client-server, distributed, or peer-to-peer system, for example. The various server applications 120 could also be implemented as standalone software programs. Additionally, although FIG. 1 depicts machines 110 as being coupled to a single networked system 102, it will be readily apparent to one skilled in the art that client machines 110, as well as client applications 112, may be coupled to multiple networked systems, such as payment applications associated with multiple payment processors or acquiring banks (e.g., PayPal, Visa, MasterCard, and American Express).

Web applications executing on the client machine(s) 110 may access the various applications 120 via the web interface supported by the web server 116. Similarly, native applications executing on the client machine(s) 110 may access the various services and functions provided by the applications 120 via the programmatic interface provided by the API server 114. For example, the third-party applications may, utilizing information retrieved from the networked system 102, support one or more features or functions on a website hosted by the third party. The third-party website may, for example, provide one or more promotional, marketplace or payment functions that are integrated into or supported by relevant applications of the networked system 102.

The server applications 120 may be hosted on dedicated or shared server machines (not shown) that are communicatively coupled to enable communications between server machines. The server applications 120 themselves are communicatively coupled (e.g., via appropriate interfaces) to each other and to various data sources, so as to allow information to be passed between the server applications 120 and so as to allow the server applications 120 to share and access common data. The server applications 120 may furthermore access one or more databases 126 via the database servers 124. In example embodiments, various data items are stored in the database(s) 126, such as the system's data items 128. In example embodiments, the system's data items may be any of the data items described herein.

Navigation of the networked system 102 may be facilitated by one or more navigation applications. For example, a search application (as an example of a navigation application) may enable keyword searches of data items included in the one or more database(s) 126 associated with the networked system 102. A client application may allow users to access the system's data 128 (e.g., via one or more client applications). Various other navigation applications may be provided to supplement the search and browsing applications.

Figure 2A:
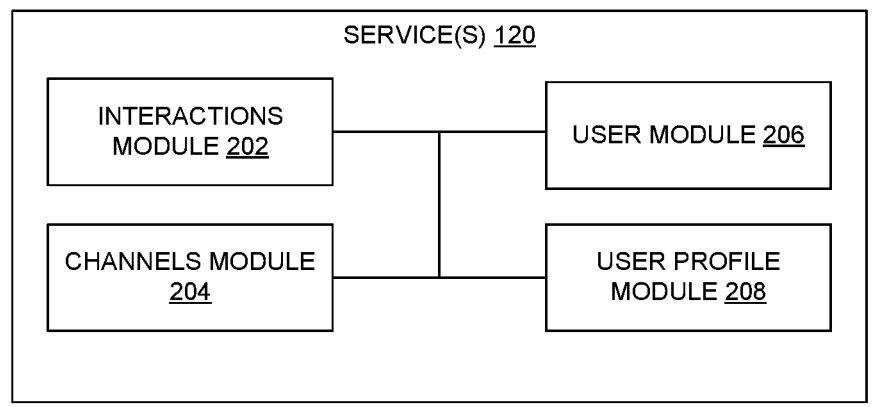
FIG. 2A is a block diagram illustrating example modules of the service(s) of FIG. 1.

FIG. 2A is a block diagram illustrating example modules of the system's service(s) 120. In example embodiments, an interactions module 202 is configured to provide access to one or more APIs for managing interactions or interactions services and/or performing one or more related tasks, as described herein. A channels module 204 is configured to provide access to one or more APIs for managing channels or channel services and/or performing one or more related tasks, as described herein. A users (or participant) module 206 is configured to provide access to one or more APIs for managing users or user services and/or performing one or more related tasks, as described herein. A profile module 208 is configured to integrate user profile data with communication platform data, as described herein.

Figure 2B:
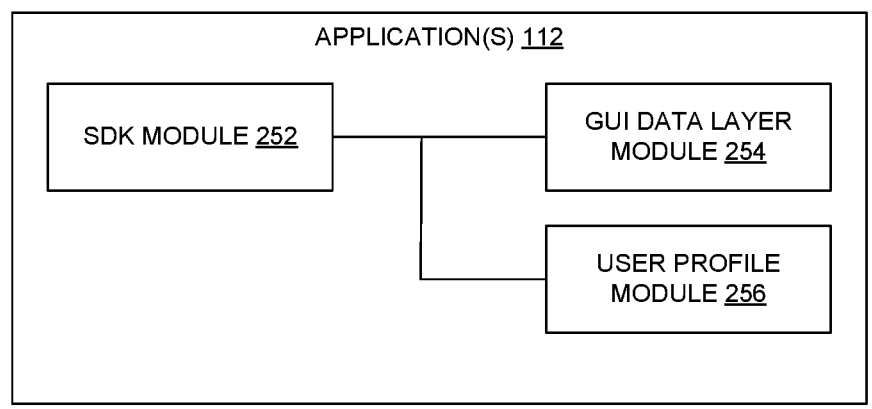
FIG. 2B is a block diagram illustrating example modules of the application(s) of FIG. 1.

FIG. 2B is a block diagram illustrating example modules of the application(s) 112 of FIG. 1. In example embodiments, an SDK module 252 is configured to provide access to one or more APIs for performing one or more tasks, as described herein. A GUI data layer module 254 is configured to provide access to a data layer for implementing GUIs, as described herein. A dynamic graphical user interface module 256 is configured to cause one or more user interfaces or user interface components or user interface elements to be presented on one or more devices, as described herein.

Figure 3:
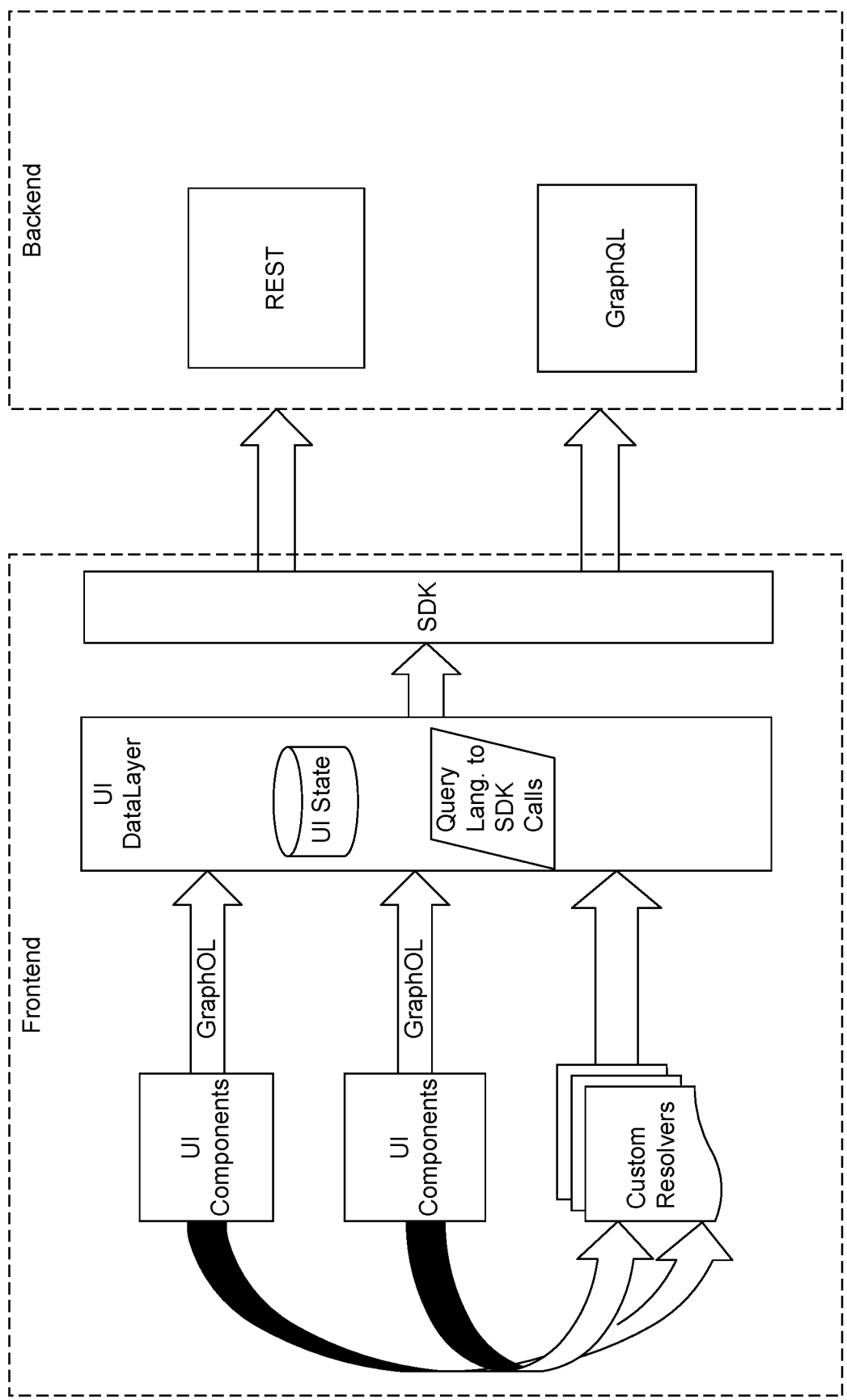
FIG. 3 is a block diagram illustrating an example frontend and backend of the system.

FIG. 3 is a block diagram illustrating an example frontend and backend of the system. In example embodiments, a UI DataLayer (also referred to herein as a GUI data layer) includes a query language library (e.g., a React GraphQL library) that uses an SDK to provide data to one or more application GUI components. The GUI data layer is configured to solve various problems, including allowing applications to declaratively ask for the data they want, build out presentational components, and implement GUI and interaction logic with or without users having knowledge of the SDK.

The GUI Data layer makes use of the SDK under the hood to perform one or more operations that one or more GUI components might need. In example embodiments, one or more users (e.g., a GUI developer) can make use of a declarative query language to obtain data and perform operations.

In example embodiments, a GUI data layer interface is automatically generated from an SDK type definition.

In example embodiments, one or more GUI data layer operations (e.g., queries or mutations) come with a typed contract to provide a user with all the documentation the user needs for composing the GUI without relying on external API documentation.

In example embodiments, one or more data items, such as a current interaction identifier (e.g., "currentInteractionSid") are not stored in an application state, but are instead stored and retrieved using one or more query language (e.g., GraphQL) mechanisms. In this way, one or more user (e.g., component developers) have a uniform querylanguage to obtain one or more data items needed for their component to render and/or function.

In example embodiments, there are no assumptions made about query language support on the backend. For example, the GUI data layer can work regardless of whether the backend supports REST, GraphQL, or another mechanism. In the case of REST, the GUI data layer may implement one or more resolvers, which call one or more underlying APIs of the SDK.

In example embodiments, the user (e.g., developer experience) includes a step to define an operation and another step to hydrate a UI with data.

FIG. 4A is an example pseudo code listing for defining an operation (e.g., to query an Invites List).

FIG. 4B is an example pseudo code listing for hydrating a user interface component with data (e.g., hydrating an InteractionsList element with data from the Invites List of FIG. 4A).

FIG. 5 is an example pseudo code listing for implementing logic for a user interface (e.g., having the InteractionsList element of FIGS. 4A and 4B)

FIG. 6 is an example pseudo code listing for functions for using queries, using mutations, and using subscriptions.

In example embodiments, the query language documentation is auto generated from the type definition and the API contracts are dictated directly by SDK. In this way, users get an interactive API documentation out of the box. Using the query language playground, they can explore the entire shape of the API and interact using a mocked version of the backend.

For OpenAPI defined endpoints, a build step can generate the query language schema from OpenAPI.

FIG. 7 is a screenshot of an example user interface for viewing the API.

Figure 8:
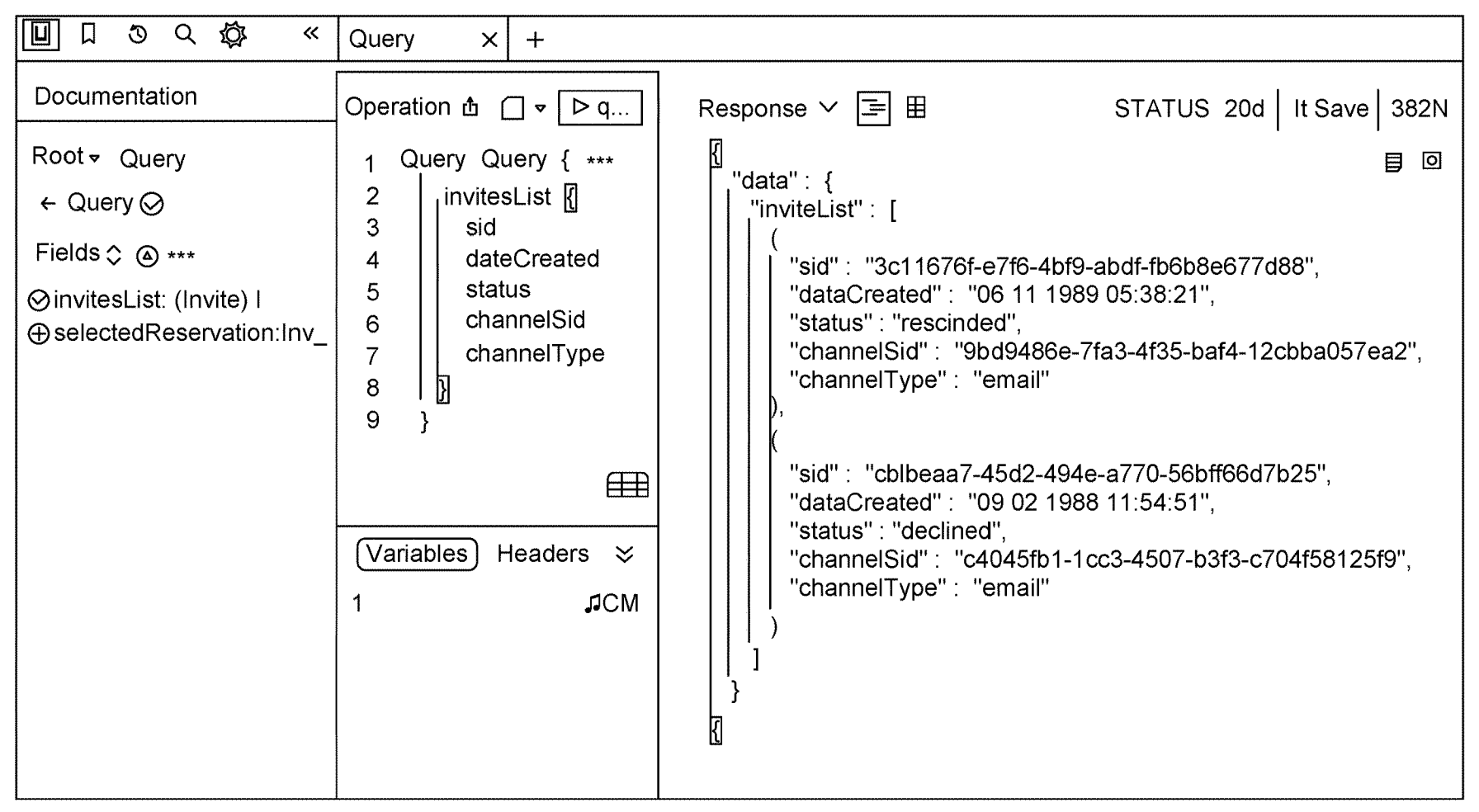

FIG. 8 is an example user interface for viewing documentation, viewing or defining an operation, and/or viewing a response to a query.

In example embodiments, user may need to learn or be familiar with the query language and/or the available entities. However, this learning curve is expected to be minimal (e.g., in comparison to learning the SDK) because users will be able to use schema-based query generation tools (e.g., as depicted in FIG. 8).

Figure 9:
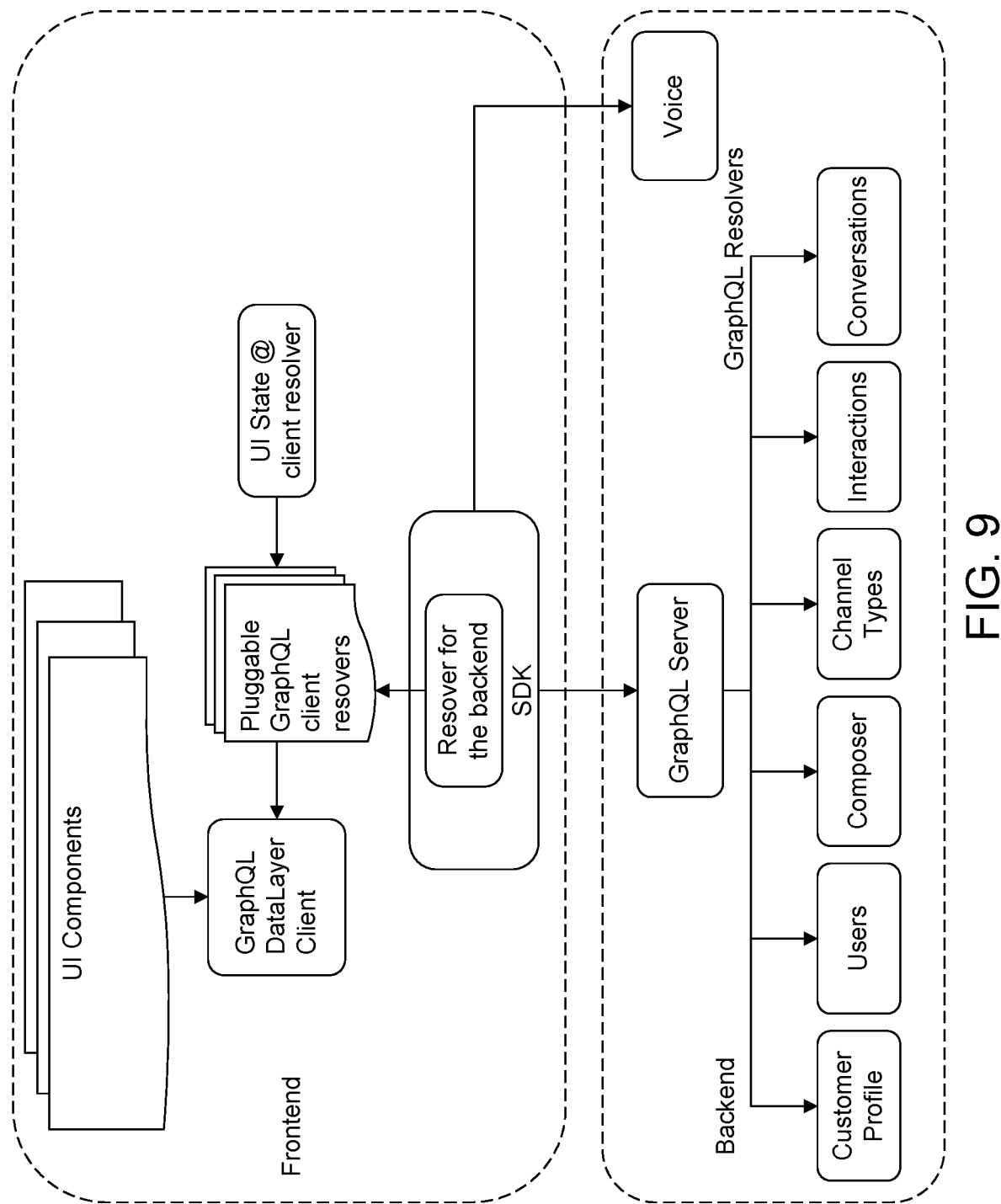
FIG. 9 is a block diagram of an example system in which data stitching is implemented on the backend.

FIG. 9 is a block diagram of an example system in which data stitching is implemented on the backend. In example embodiments, the backend includes a query server (e.g., a GraphQL server). In example embodiments, standard query language hooks are available to one or more GUI components for query or mutations using the query or mutation functions, respectively. A query language client resolve registration API is available so that a GUI component library can register a GUI state resolver. This registration API may also be exposed for external users so that the client side query language can be extended by users (e.g., to combine or fetch their own external data). In example embodiments, as much of the data as possible is stitched on the server side.

Figure 10:
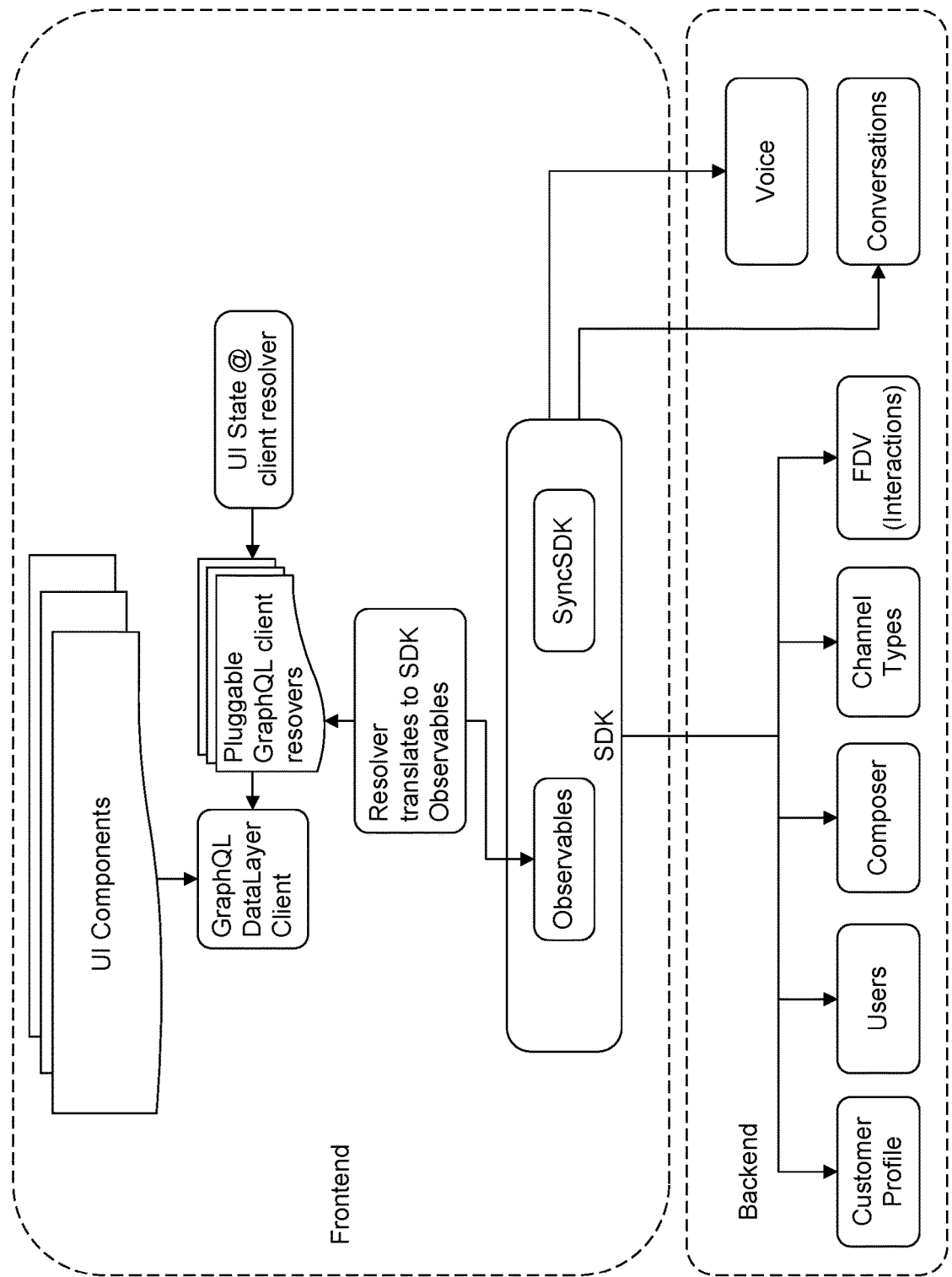
FIG. 10 is a block diagram of an example system in which data stitching is implemented on the frontend.

FIG. 10 is a block diagram of an example system in which data stitching is implemented on the frontend. In example embodiments, the backend includes a query language server (e.g., a GraphQL server). In example embodiments, the GUI components user the query language server, but there are client-side query language resolves to transform the calls into SDK calls for one or more observables.

FIG. 11 is a table describing example phases of implementing an Omnichannel Data Model for various programmable entities (e.g., for data structures representing an Interactions List, an Interactions View, Channel Media Events, Channel Media Participants, and/or an Invites List), including with respect to data sources and data stitching. In example embodiments, in a first phase, data sources and stitching include one or more flexible data views (FDVs) and/or one or more synchronization processes for providing runtime data to the SDK. This provision of run time data may be direct (e.g., HTTP requests between the SDK and the system) and/or indirect (e.g., data prepared by the system that is served to the SDK by an intermediate, such as one or more synchronization processes.) The system may be responsible for updating documents and/or directly providing aggregate or composite data.

For data correctness and consistency, the system may strictly maintain chronological ordering over a given timeline or perform time-reconciliation processing to ensure correct ordering. Events may be assumed to arrive in chronological order. Known errors in ordering and missed events may be identified and handled. For availability, horizontal and/or vertical scaling may be automated. The system may be protected by rate limiting, throttling, and/or a circuit breaker. A degraded mode may be provided (e.g., to account for failures in systems dependencies, including one or more synchronization processes or Kafka processes, or an outage to the interactions API). For latency, a configurable threshold may be set as a benchmark. In example embodiments, the system has two core functions: (1) an event consumer and (2) a document writer. The documents may include a given user's offered and rescinded invites, a given invite, a given user's active interactions, a given interaction. Each document may be a standalone and schema-less object (e.g., a JSON object). The system may be configured to handle one or more specific events. Each event may prompt the system to create, update, or delete relevant documents.

In a second phase, a query language server (e.g., a GraphQL server) and and/or FDV in combination with one or more APIs (e.g., Interactions API, Channel APIs, and so on) may provide the data to the SDK.

In a third phase, a query language server may be used by itself or along with one or more APIs to provide the data to the SDK.

FIG. 12A is a table describing example phases of implementing Omnichannel APIs on the SDK, including APIs for handling outbound voice communications, accepting and posting invitations, rejecting invitations, and/or getting a channel. In a first phase, the Omnichannel APIs may be based on observable data from the SDK. The APIs may then be transitioned such that they are incorporated directly into the SDK and/or use a graph query language in additional phases.

FIG. 12B is a table describing example Omnichannel GUI sources. In example embodiments, a GUI component for an Interactions List, Invites List, and/or Communication Canvas may be connected to one or more FDVs or APIs as data sources. For an Interaction List, such FDVs may include an FDVs for an Interaction List and/or an Interaction View and such APIs may include APIs for Interaction Lists, Interaction Views, Topics, Profiles (e.g., user or end customer profiles), and/or conversations. For an Invites List, such FDVs may include an FDV for an Invite List and/or an Interaction View and such APIs may include APIs for an Invites List, Topics, or Profile. For an Invites List, such FDVs may include an FDV for an Interaction View and such APIs may include APIs for an Interactions, Topics, Profiles (e.g., end customer profiles), users, and/or conversations.

Figure 13:
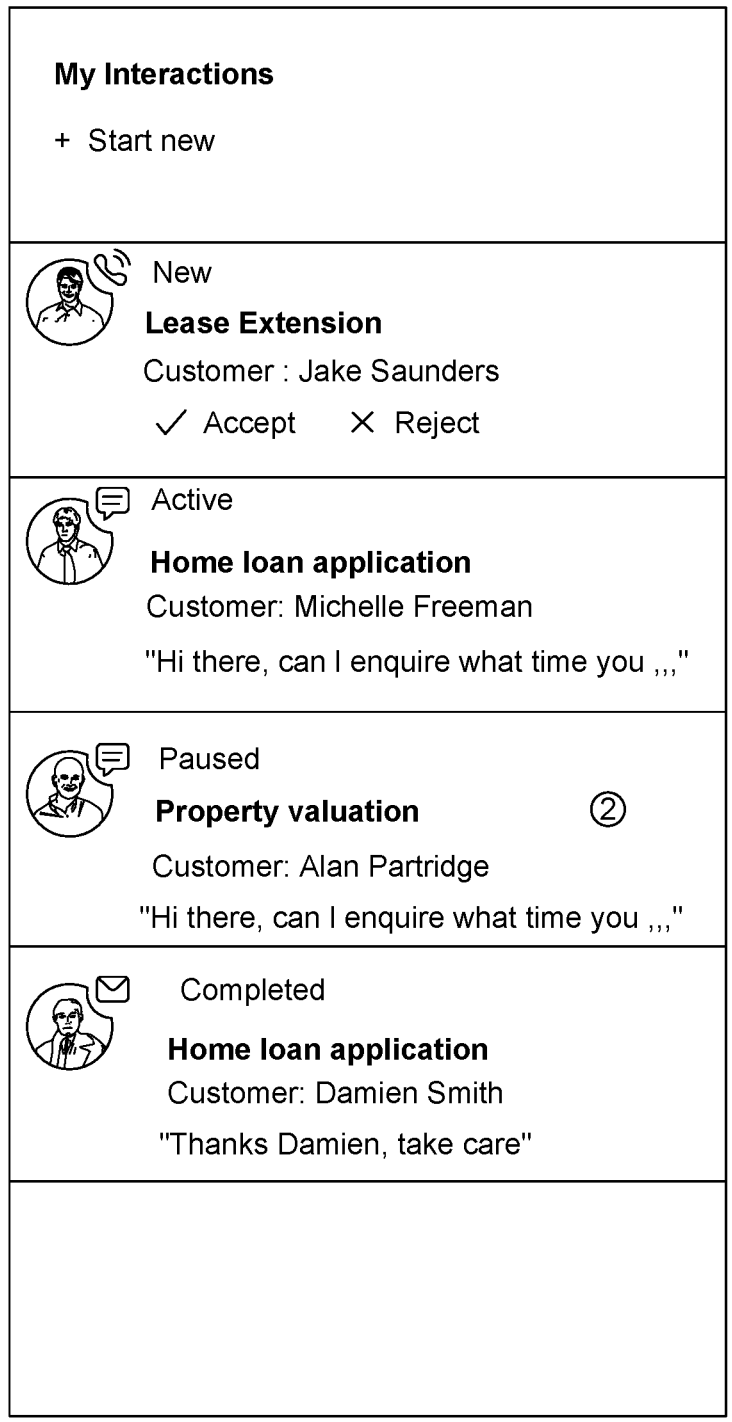
FIG. 13 is a screenshot of an example interaction list GUI component.

FIG. 13 is a screenshot of an example interaction list GUI component. In example embodiments, the interaction list GUI component displays incoming Invites, and gives the User options to Accept or Reject those invites. An Invite UI element shows information about a Topic, an Interaction-Channel media type, a Customer Name, and a Customer image.

In example embodiments, the interaction list GUI displays a list of Interactions that the Representative may be interested in seeing. The view of the Interaction in this example list has Interaction.status, a Topic, the Customer Name and Image, the latest active channel media type, and the latest InteractionChannelEvent for that interaction.

In example embodiments, selecting an Interaction on the list fires events that display the interaction details across other GUI components, including a CommsCanvas, a Customer Details, and/or a Timeline.

FIG. 14 is a pseudo code showing an example query of selecting from the invites list. In example embodiments, the invites list is a list of either offered or accepted Invites for a single User/Service Instance and/or a list of "OFFERED" Invites for a single User/Instance. In example embodiments, the data contains a core Invites object and is augmented to satisfy one or more GUI requirements.

In example embodiments, an example API call is GET /v3/Instances/{instanceSid}/Invites?userId='USxxxx'.

In example embodiments, the GUI may require on e or more of Get /Topics, Get/CustomerProfile, or GET APIs.

FIG. 15 is pseudo code showing an example query for selecting an interactions identifier (e.g., Interactions. Sid) from an Interactions object. In example embodiments, the Interactions List includes a list of interactions that a user may be interested in seeing.

An example of a single API includes the following: GET v3/Instances/{instanceSid}/
Interactions?userSid=USxxxxxx.

An example of multiple APIs calls include the following:s
GET v3/Instances/{instanceSid}/Interactions
GET v3/Instances/{instanceSid}/Interactions/{InteractionSid}/Channels
GET v3/Instances/{instanceSid}/Interactions/{InteractionSid/Channels/{ChannelSid}/Participants With one or more such example APIs, a user may choose a default view of one or more interactions in an interactions list based on interaction status (e.g., for one or more representatives); filter one or more interactions based on interaction status; pagination of interactions on the interaction list; and/or bookmark/pin interactions.

FIG. 16 is a screenshot of an example communications canvas GUI component (also referred to herein as a "CommsCanvas"). In example embodiments, the ConmsCanvas GUI component includes a detailed view of an Interaction and/or includes media (e.g., messages, emails, or calls) associated with one or more communication channels.

FIG. 17 is a pseudo code listing of an Interaction View object.

In example embodiments, direct API calls may be used to build an initial view, such as the following:

GET v3/Instances/{instanceSid}/Interaction/{InteractionSid}
GET v3/Instances/{instanceSid}/Interactions/{InteractionSid}/Channels
GET v3/Instances/{instanceSid}/Interactions/{InteractionSid/Channels/{ChannelSid}/Participants
GET v3/Instances/{instanceSid}/Topics
GET /Users/{UserSid}

```
GET /CustomerConnect/{CustomerSid}
GET /Messages (Conversations API)
```

In example embodiments, the CommmsCanvas then polls for updates to one or more of the following:
  Interaction.status
  Channel.status
  Participant.status
  Participant.properties (to check for mute/hold)
  Messages
  InteractionChannelEvent (e.g., Messages, InteractionChannel, InteractionChannelParticipant)

In example embodiments, an interaction may be defined as follows:

```
"interaction": {
    "status": "active",
    "date_created": "2022-08-22T18:15:35.194Z",
    "sid": "KD6cd362874501a721f6fe990d4118283e",
    "channels": {
      "KEac7c8098e45f66405342ccc9ddec6c3e": {
        "status": "active",
        "media_sid": "<<ConversationsSid>>",
        "date_updated": "2022-08-22T18:15:59.22Z",
        "participants": {
          "KJfa4a531cf69ad6c6281d3a94737b8274": {
            "status": "joined",
            "user_sid": null,
            "external_identifier": "SomeCustomerSid",
            "sid": "KJfa4a531cf69ad6c6281d3a94737b8274",
            "participant_media_sid": "<<ConversationParticipantSid>>"
              "hold": true,
              "Mute": true
            "twilio_address": null,
            "address": null,
            "date_created": "2022-08-22T18:15:36.043Z",
            "type": "customer"
          },
          "KJe76a3490744fdcd9c514706c87e9e860": {
            "status": "joined",
            "user_sid": "US6c02bf6b1562711edf987be2f15e349a",
            "external_identifier": null,
            "sid": "KJe76a3490744fdcd9c514706c87e9e860",
            "participant_media_sid": "<<ConversationParticipantSid>>",
            "twilio_address": null,
            "address": null,
            "date_created": "2022-08-22T18:15:41.437Z",
            "type": "user"
          }
        },
        "sid": "KEac7c8098e45f66405342ccc9ddec6c3e",
        "date_created": "2022-08-22T18: 15:35.511Z",
        "interaction_sid": "KD6cd362874501a721f6fe990d4118283e",
        "type": "sms"
      }
    }
  }
```

From the entity's perspective, the one or more end profile data APIs allow the entity to integrate profile data of their users (e.g., end customers), such as end profile data stored in one or more applications, with data pertaining to interactions and/or user communications, such as data associated with a communication platform. In example embodiments, the entity can use the one or more APIs (e.g., in one or more custom applications) to ensure that representatives of the entity have a better view and understanding of the users when communicating with them. The entity can also manage configurations associated with their data integration to, for example, create, view, and delete the configurations. The entity can also lookup profile data stored in one or more third-party or external applications. The entity can also seamlessly integrate communication platform data with end profile data so that the entity can use the third party or external applications to store and/or resolve user profiles and use the communication platform to drive context about the user to the entity's representatives. The entity can also search user profiles (e.g., based on user name, phone number, and/or email address) (e.g., so that the entity's representatives can find the right information about the user when communicating with the user). The entity can also securely connect to one or more webhooks (e.g., registered by the user) that may be used to authenticate and/or get access to the user data. The entity can also build functionalities to create new user profiles or edit existing user profiles (e.g., based on input from a representative or in an automated fashion).

From an administrator's perspective, the one or more APIs allow the administrator to view the details of the data integration, such as third-party account ID, name, URL, and endpoints that have been registered that drive the connection, look up, creation of profiles, and other features that have been registered with the entity's account (e.g., to get clarity on the data sources being used to drive the user profiles integration).

From a representative's perspective, the one or more APIs allow the representative to be able to view user information along with history or user/customer journeys associated with their interactions. The representative is able to look up user profiles (e.g., by name, email address, or phone number) in order to get context and understand of the user. The representative can update a user's information to be up-to-date and correct to ensure that it is easier and more seamless to have future communications with the user.

In example embodiments, one or more APIs are provided that query information on the user and provide a point of context associated with the user. An aggregated user profile data object can be leveraged by other functionalities that use aggregated user profile data, such as a Timeline, Omnichannel Canvas, Flows for routing, and so on.

An entity can build a connector, which is the implementation of the interface. With this interface, users can integrate one or more software applications that store user profile information.

In example embodiments, a connector or an integration is provided for a specific software, such as a specific CDPI software, that helps the entity to seamlessly integrate data from the CDP with other data associated with a communication platform, such as communication and/or interaction data.

In example embodiments, the one or more APIs provided include one or more of a Profile Connector Interface, a Profile Connector Interface, a Profile Interface, an Address Resource Interface, an Additional Contact Resource Interface, or a Profile Connection Resource Interface.

In example embodiments, an entity implements the Profile Connector Interface (e.g., in a custom application) to enable the one or more of the following actions: mapping or determining an incoming communication to their user profile, creating a user profile for a new user, updating the user profile for an existing user, or searching for a user based on inputs, such as a phone number, name, or email address.

In example embodiments, one or more sets of communication data managed by a communication system is integrated with the one or more sets of data (e.g., user profile data) managed by one or more systems external from the communication system. Some or all of the integrated data may be (1) surfaced in one or more user interfaces, such as a user interface presented to a representative in a contact center or a manager of one or more representatives in a contact center, (2) surfaced in one or more widgets or canvases, such as a timeline widget or an omnichannel canvas, that may be included in the one or more user interfaces a manager within a contact center, and/or (3) used to make routing decisions or inform routing logic for interactions being processed in a contact center.

One or more timelines or timeline widgets, as described herein, may be generated, stored, accessed, modified, edited, customized, and presented as a visual representation in one or more graphical user interfaces (GUIs), as described herein, and may be configured to include one or more sets or one or more subsets of the user profile data that is connected via the one or more connectors.

Such timelines may be integrated into one or more customized workflows corresponding to one or more users of an entity, such as a user identified (e.g., via a user identity service) as being associated with an incoming communication with the entity. Such engagement workflows may include one or more workflows through a contact center, such as for a user (e.g., end customer) journey associated with one or more topics corresponding to an interaction, as described herein. In example embodiments, a topic represents a tag or category selected from a classification system for classifying an interaction, and may represent an intent of a user. In example embodiments, the timeline and tools for generating, storing, accessing, modifying, customizing, and presenting the timeline may be made accessible (e.g., programmatically, via an API, and/or via one or more GUIs) to one or more users associated with the entity, administrators of the entity, representatives of the entity, or systems, including machine-learning systems, chatbots or other systems configured to automate tasks (e.g., including workflow tasks), and so on, as described herein.

In example embodiments, a timeline includes information pertaining to each of a user's historical interactions with an entity, such as a business entity.

The SDK supports generating specialized and/or customized user data objects; adding, editing, and removing data, including data pertaining to communication data and communication metadata (e.g., corresponding to voice or digital communications managed by a communication platform) and/or user data (e.g., information about an entity's users managed by one or more systems of the entity, such as CDP systems of the entity), using the user profile data objects; and/or surfacing at least one or more subsets or summaries of the one or more subsets of the data objects in one or more custom applications, such as one or more contact center applications or other communication applications.

In example embodiments, one or more custom applications may call one or more APIs of a timeline feature (e.g., implemented as a software as an application (SaaS) or other service) to access the user data object (e.g., corresponding to the timeline of one or more interactions of a user) to retrieve data pertaining to an interaction of the user. In example embodiments, the user data object is specially stored and/or configured to provide efficient real-time access all or one or more subsets of the data stored in or referenced from the timeline object for surfacing in real-time in a custom graphical user interface (GUI), such as a custom user interface configured to present a summary of the data to an agent or representative in a contact center. The representative may then view the summary of the data when determining whether to accept an invitation to process the interaction. If the representative chooses not to accept the invitation, the interaction may be routed to one or more additional representatives, who, in turn, may view a visual representation of the user data object, including the summary of the data, and make a decision of whether to accept the invitation.

Upon acceptance of an invitation by a representative, further information pertaining to the timeline may be populated into the user interface of the representative to allow the representative to process the interaction efficiently. In example embodiments, the information that is presented in the representative's user interface at each stage of a user's journey (e.g., a first stage occurring before the representative accepts the invitation, a second stage occurring while the representative is handling or processing the interaction, and a third stage occurring when the representative is done handling or processing the interaction) is customizable and/or configurable by systems of the representative, the entity, or the user, or any combination of such systems (e.g., using the timeline API or options available within one or more user interfaces presented to the users via the systems of the users). Thus, for example, a summary of various data fields may be presented in a visual representation of a user data object in a user interface during the first stage and more detailed information may be presented in the user interface upon accepting of an invitation by a representative in the second stage. In example embodiments, the more detailed information may be based on various factors, such as an association of one or more topics with communication data, user data, and/or metadata pertaining to the interaction that is being handled or processed.

In example embodiments, data pertaining to previous communications of the user, such as data maintained and stored in data stores managed by a communication platform, is merged, aggregated, or integrated with data pertaining to the user, such as the user's profile data or custom data about users, that is managed and stored in systems managed by the entity or accessible from systems managed by the entity separately from the communication platform. In example embodiments, the integration of the separate data sets is performed using the connector built by the entity, as described herein.

The entity can integrate profile data from third-party systems by implementing resolve, create, and update endpoints and adding a generic connector (e.g., CDP connector) block or by adding a CDP-specific connector block. The connector takes application connection details as inputs. The entity registers the connection details as a user profile connection resource (e.g., via a post call to the API), and passes the identifier of the created connection as an input to the connector. With the connector registered, the system calls the endpoints registered as part of the connector.

Having the communication platform data aggregated with external data into a user profile data object and using an API to query the user profile data object provides more efficient access to the data (e.g., for handling an interaction in real time) than other aggregation techniques, such as, for example, querying the external system directly when the data is needed.

In example embodiments, the connector allows one or more of the following actions to be performed: mapping or determining of an incoming communication to a user profile, creating a user profile for a new user, updating the user profile of a user, or searching for a user based on inputs, such as a phone number, name, or email address.

In example embodiments, the representative may specify one or more values of one or more new data items and modify the user data object corresponding to an interaction such that the values are merged or added to the user data object. The one or more new data items may then be accessible to subsequent representatives who access the user data object, such as when an interaction is routed to the one or more subsequent representatives for handling or processing the interaction. In example embodiments, one or more of the data values stored with respect to the user data object may be references to data items rather than actual values of data items. Thus, for example, user data, such as user data that is stored in systems managed by the entity separately from the communication platform. may be associated with the user data object without requiring the actual values of the data items to be stored in the user data object. In example embodiments, the use of references may reduce the regulatory burden on the data owner.

In example embodiments, an interaction represents a user contact. Interactions may comprise a single work record for some or all of the ongoing and past conversations over one or multiple channels between entity representative(s), system(s), and contact(s), and/or data needed to provide personalized and contextual user engagement. Interactions enable developers to build structured, directed communication workflows with the capability to address reporting and audit needs. In example embodiments, in a contact center context, an interaction may represent a contact center work item that needs to be processed by the contact center representative An interaction may represent a user engagement. In example embodiments, it maps to an end-customer. A user can participate in one or more simultaneous interactions.

An interaction may be omnichannel. For example, Interactions support synchronous channels (e.g., voice, video) and asynchronous channels (e.g., chat, messaging, email) supported by a communication platform.

An interaction supports custom channels. In example embodiments, this allows entities to route any piece of work in an organization while providing context and a holistic view of each touchpoint for a user.

An interaction may be channel agnostic and/or it may be performed over 0 or more communication channels, including custom channels, and/or over a non-contiguous timeline.

Channels of an interaction may be agnostic to external, internal humans or systems as participants. At a given time, Interactions channels may have zero or more participants.

An interaction may get offered (e.g., via an invitation) to one or many users or systems, such as contact center representatives or machine-learning systems, and the users or systems may accept or decline the interaction for processing.

An interaction may have a state which includes active, inactive (similar state parked or snoozed), and closed. In example embodiments, once closed, an interaction cannot reactivate. It can be closed by humans or systems.

An interaction may have a well-defined start and end signal and duration with a disposition.

An interaction may include a container to log and retrieve real-time and historical conversations and events. Logged interactions may be stored in a data object specially configured to represent the interaction data over a timeline.

An interaction may serve as a source of truth for data required to derive metrics, calculate KPIs, and/or route the interaction to the right available entity representative.

An interaction may get grouped in zero or more views. Views group interaction by attributes such as time, system state, and attached tags. Views are versioned and have a known refresh rate to support real-time and historical use cases. The views may be surfaced in one or more user interfaces.

An interaction may expose an interface for orchestrating user engagement workflows such as routing, channel control operations such as hold, transfer, barge, whisper, and/or post-wrap-up actions, etc.

An interaction may include a resource to handle user contact and/or a container for omnichannel conversations. In example embodiments, an interaction exposes an interface to manage channels and participants attached to a user contact.

An interaction may have one or more states. These states may include any of the following states: Closed: The interaction is considered to be complete and no further activity will happen. In example embodiments, a closed interaction cannot be reopened but additional context can be added to it.

Inactive: The interaction becomes inactive if Activity pauses on it for some duration. A user or a system can put interaction in Inactive state. More activity can take place which will bring the interaction back to an active state. Active: The interaction is created in Active state.

In example embodiments, interactions are represented as a single work record for all the ongoing conversations over one or multiple channels between a business representative(s) or a system (such as IVR, chatbot, etc.) and the user. Data needed from different systems/applications to support one or more topics associated with each interaction and/or from other business backend operations that can bring information to help provide personalized, contextual user engagement. Interactions may allow entities to build structured, directed communication workflows with capability to address reporting and audit needs. It supports voice and digital channels, including email as asynchronous channels, with messaging and email channels through unified omni-channel conversations. Interactions also support custom channels allowing entities to route any piece of work in an organization while providing context and a holistic view of each and every touch point for a user.

The system provides a single source of truth about anything that has happened during or after the life cycle of an interaction. It includes a single data source for all real-time and historical data to derive metrics, calculate KPIs, and to route the interaction to the right available representative or system.

Behind Interactions sits a well-defined data model called an Interaction Detail Record (IDR). IDR is a representation of the Interactions from being created until closed. It is a cradle-to-grave view, highlighting who did what and when. Although IDR's may be defined to address specific contact center needs, they are not exclusively for Contact Centers. The IDR can address the requirements of any entity communicating in which internal users, such as representatives, communicate internally with each other or with outside users, such as customers.

Each interaction consists of participants that represent the parties in the interaction that contribute to the communication channel. Examples of participants are External (e.g., customer), User (e.g., agent), IVR, Queue, Bot, or System. Participants communicate using specific channels which are represented in the data model of Interactions. An interaction maintains a roster of one or more participants which each may be connected to one or more channels. With each state change, more granular parts demarcate noteworthy differences in each timespan, such as when the state of a voice channel goes from talking to on hold.

Parts are the atoms of an interaction. In example embodiments, the system may be configured to incrementally build a detailed record view in real/near-real-time as each part occurs. Each part contains a collection of attributes/dimensional data specific to that level of the detail record hierarchy (e.g., ANI/DNIS/email, state, queue id, team id, user id, direction, disposition code, disconnect reason, etc.). Each part may intrinsically carry specific context and information to support very granular drill-down.

For example, the agent parts convey relevant identifiers (e.g., queue, user, interaction, and disposition codes), channel actions (e.g. when did the agent put the user on hold), and state changes (e.g. when an interaction becomes inactive). Another example is the system participants such as ACD/queue. For these participants, parts may contain a record of the routing decisions employed in order to get the interaction routed to an agent (e.g., skills-based routing). As a final example, the IVR/bot participant can also include important context (e.g. id/version of the bot employed in that interaction and which conditional/control branches the user traversed and when, etc.).

In summary, every participant in an interaction may play a particular role and generate unique parts that are captured in an IDR for storage and further analysis.

In example embodiments, an interaction represents a single work item that needs to be processed. It represents a contact between an entity representative and a user related to the same or a similar topic. Interactions are channel-agnostic and may represent voice, web chat, SMS, WhatsApp, Email, and so on, and can support multiple channels simultaneously. Interactions may support multi-party conversations.

In example embodiments, the disclosed API facilitates live message and file exchange between multiple participants on supported channels (SMS, MMS, Whatsapp, in-app chat, email, and so on). The API may explicitly focus on facilitating active communication and may provide search tools that enable discovery of ongoing and archived conversations or communications, and include non-message "events" in the timeline like "participant added to the thread."

The user (e.g., customer) journey is about the user lifecycle and total context of the user incorporating all the communications throughout the life time. A journey would be one or more interactions as well as other, non-interaction data. This view of a user lifecycle spanning over several specific encounters (interactions) can give broader context to an agent about the user and be used to build user interfaces.

Context Store is the storage of messages, conversations, events, timelines, and the relationships between these items on a timeline. Interactions may add to the Context Store, allowing users to see journey information that includes interaction and non-interaction data.

In example embodiments, Interaction Detail Records are different from the context store in its near/real-time requirement, its structured data model, and its defined start and end-time.

In example embodiments, a touchpoint record or engagement record is a user touchpoint is a record of any time a consumer interacts with a company, through an interaction, managed by an agent, an interaction managed by a bot, a website, a CDP, or an application. From now on touchpoints and Timeline Records will be mentioned and they can be treated as the same term in the Timeline Service context.

In example embodiments, a timeline includes a list of touchpoints of aa user in a company over a specific period of time. It typically includes key touchpoints. such as purchase or service interactions, support requests, and communication with the company. A user timeline is used to understand the user's experience and identify any pain points or areas for improvement.

In example embodiments, a timeline record includes a touchpoint that might represent any interaction of users with the company using a communication platform or through their external systems.

In example embodiments, platform timeline records include a type of touchpoint or timeline record of any time a consumer interacts with an entity using internal communication platform services or external (e.g., CDP) services.

In example embodiments, interaction timeline records include a type of touchpoint or Timeline record of any time a user interacts with an entity using Interactions. An interaction might be managed by or surface to an agent, by a bot an IVR, etc., or any participant that can handle Interactions in the system.

In example embodiments, external timeline records include a type of touchpoint or Timeline record of any time a user interacts with an entity outside of a communications context; for example, the user submitting a loan application, signing a contract with the company, or interacting with external systems like CDPs, company websites, or company systems, etc.

A major pain point for the user is repeating themselves with each interaction or transfer. In order to remove this repetition, the intention is to provide representatives, systems, and other parties with a timeline that lists previous interactions. The timeline may be retrieved for the user when they connect with a representative and may be drawn from interactions (including communication channels and participants), user profiles, and topics.

In example embodiments, a custom application inputs an user identifier (e.g., via the API) and receives a timeline as output, such as a timeline data object and/or a rendered timeline. In example embodiments, the timeline services are only available to authenticated actors with authorized roles (e.g., using roles and permissions as defined by the entity).

Example Mobile Device

Figure 18:
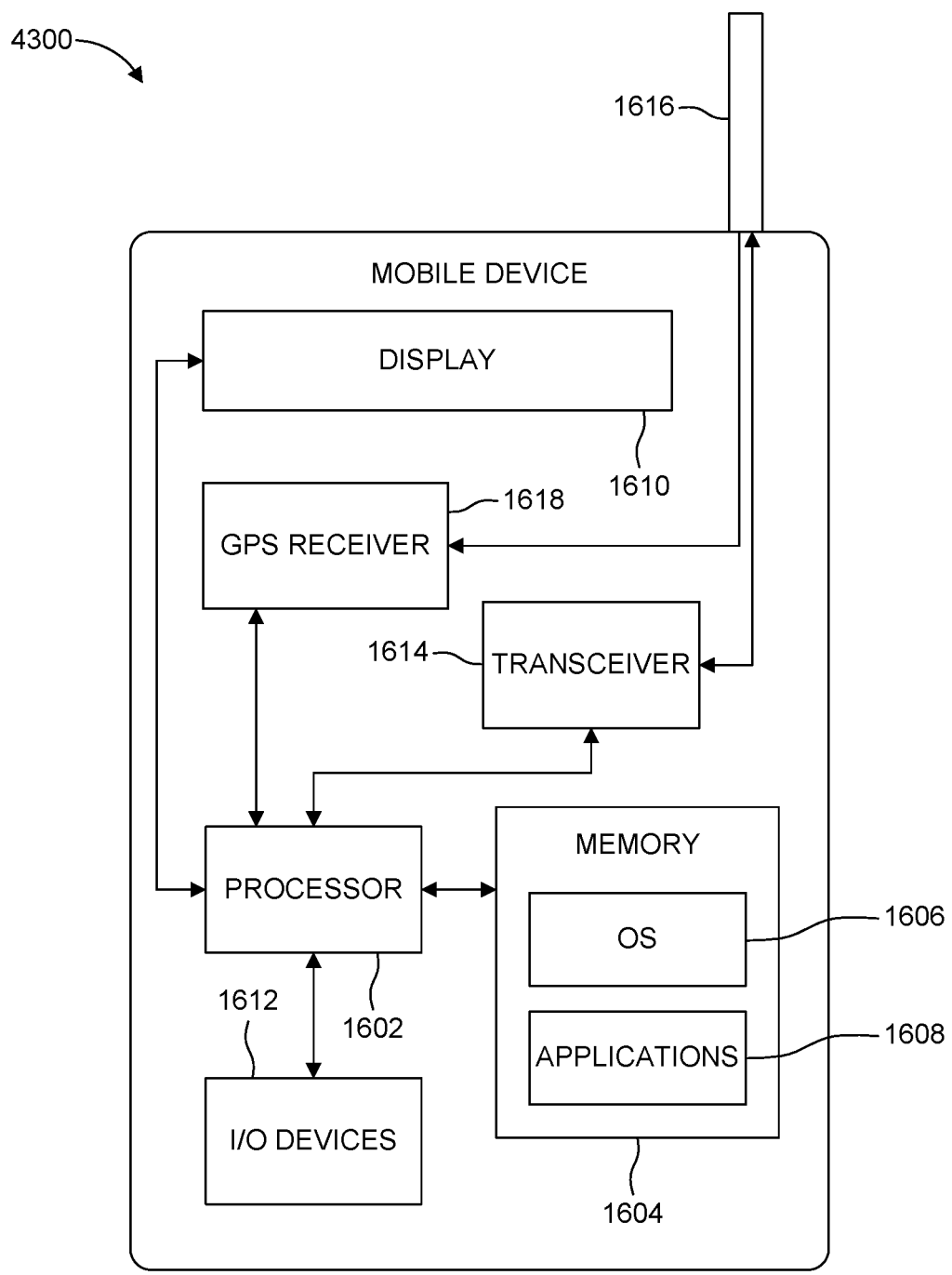
FIG. 18 is a block diagram of an example mobile device, according to an example embodiment.

FIG. 18 is a block diagram illustrating a mobile device 4300, according to an example embodiment. The mobile device 4300 can include a processor 1602. The processor 1602 can be any of a variety of different types of commercially available processors suitable for mobile devices 4300 (for example, an XScale architecture microprocessor, a Microprocessor without Interlocked Pipeline Stages (MIPS) architecture processor, or another type of processor). A memory 1604, such as a random access memory (RAM), a Flash memory, or other type of memory, is typically accessible to the processor 1602. The memory 1604 can be adapted to store an operating system (OS) 1606, as well as application programs 1608, such as a mobile location-enabled application that can provide location-based services (LBSs) to a user. The processor 1602 can be coupled, either directly or via appropriate intermediary hardware, to a display 1610 and to one or more input/output (I/O) devices 1612, such as a keypad, a touch panel sensor, a microphone, and the like. Similarly, in some embodiments, the processor 1602 can be coupled to a transceiver 1614 that interfaces with an antenna 1616. The transceiver 1614 can be configured to both transmit and receive cellular network signals, wireless data signals, or other types of signals via the antenna 1616, depending on the nature of the mobile device 4300. Further, in some configurations, a GPS receiver 1618 can also make use of the antenna 1616 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 19:
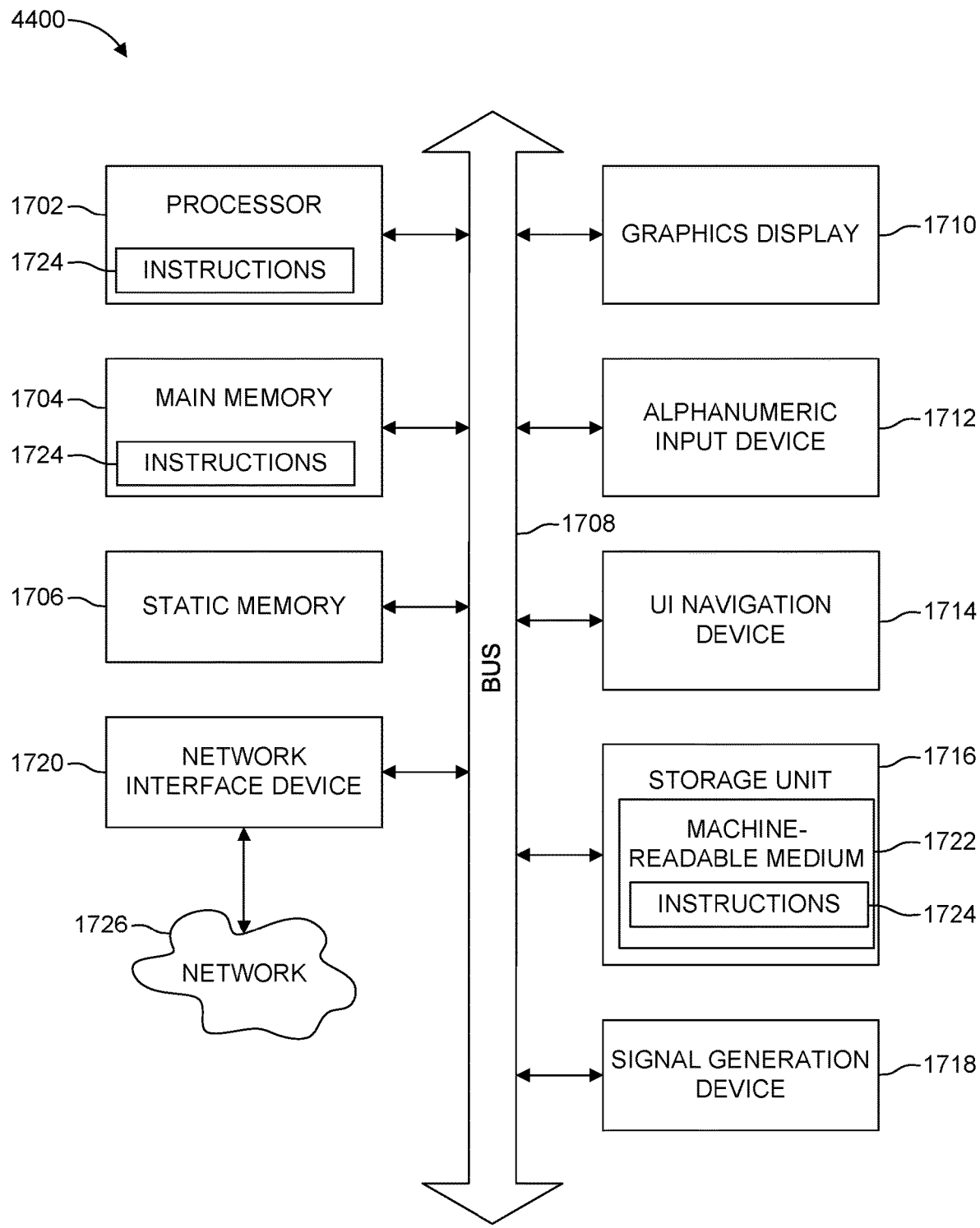
FIG. 19 is a block diagram of a machine in the example form of a computer system within which instructions for causing the machine to perform any one or more of the methodologies discussed herein may be executed.

FIG. 19 is a block diagram of an example computer system 4400 on which methodologies and operations described herein may be executed, in accordance with an example embodiment. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 4400 includes a processor 1702 (e.g., a central processing unit (CPU), a graphics processing unit (GPU) or both), a main memory 1704 and a static memory 1706, which communicate with each other via a bus 1708. The computer system 4400 may further include a graphics display unit 1710 (e.g., a liquid crystal display (LCD) or a cathode ray tube (CRT)). The computer system 4400 also includes an alphanumeric input device 1712 (e.g., a keyboard or a touch-sensitive display screen), a user interface (UI) navigation device 1714 (e.g., a mouse), a storage unit 1716, a signal generation device 1718 (e.g., a speaker) and a network interface device 1720.

Machine-Readable Medium

The storage unit 1716 includes a machine-readable medium 1722 on which is stored one or more sets of instructions and data structures (e.g., software) 1724 embodying or utilized by any one or more of the methodologies or functions described herein. The instructions 1724 may also reside, completely or at least partially, within the main memory 1704 and/or within the processor 1702 during execution thereof by the computer system 4400, the main memory 1704 and the processor 1702 also constituting machine-readable media.

While the machine-readable medium 1722 is shown in an example embodiment to be a single medium, the term "machine-readable medium" may include a single medium or multiple media (e.g., a centralized or distributed database, and/or associated caches and servers) that store the one or more instructions 1724 or data structures. The term "machine-readable medium" shall also be taken to include any tangible medium that is capable of storing, encoding or carrying instructions (e.g., instructions 1724) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1724 may further be transmitted or received over a communications network 1726 using a transmission medium. The instructions 1724 may be transmitted using the network interface device 1720 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
   one or more computer processors;
   one or more computer memories;
   a set of instructions incorporated into the one or more computer memories, the set of instructions configuring the one or more computer processors to perform operations, the operations comprising:
   receiving a plurality of connectors, each of the plurality of connectors implementing one or more endpoints for aggregating data corresponding to a plurality of applications into a connection resource accessible via a plurality of server-side Application Programming Interfaces (APIs), each of the plurality of connectors having a type that indicates a type of mapping for integrating user profile data between a communication platform and one or more external systems, wherein the type of mapping defines how to map incoming communications to user profiles, create new user profiles, update existing user profiles, and search for users based on input parameters;
   generating a schema definition from the plurality of server-side APIs, each of the plurality of server-side APIs corresponding to a different server-side data store of a plurality of server-side data stores, the schema definition defining a hierarchy of supported types, the hierarchy of supported types including one or more custom object types, each of the one or more custom object types having a plurality of fields;
   providing the schema definition to a client system;
   receiving at least a portion of a query from the client system, the at least the portion of the query built according to the schema definition, the at least the portion of the query specifying a custom object type of the one or more custom object types;
   determining to resolve a first field of the plurality of fields corresponding to the specified custom object type using a data item stored in a first server-side data store of the plurality of server-side data stores, the determining to resolve the first field based on an accessing of a first server-side resolver, the first server-side resolver associated with the first field;
   determining to resolve a second field of the plurality of fields corresponding to the specified custom object type using a data item stored in a second server-side data store of the plurality of server-side data stores, the determining to resolve the second field based on an accessing of a second server-side resolver, the second server-side resolver associated with the second field; and
   aggregating the data item stored in the first server-side data store with the data item stored in the second server-side data store into the connection resource for including in a response to the at least the portion of the query for sending to the client system, the aggregating performed using the one or more endpoints corresponding to the plurality of connectors.

2. The system of claim 1, wherein the one or more custom object types includes a timeline object type.

3. The system of claim 1, wherein the one or more custom object types includes a user object type.

4. The system of claim 1, wherein a first data store of the plurality of data stores corresponds to a timeline object and a second data store of the plurality of data stores corresponds to a user object.

5. The system of claim 1, further comprising hydrating one or more user interface elements in real time with the resolved first field and resolved second field.

6. The system of claim 5, wherein the one or more user interface elements are included in a communications canvas.

7. The system of claim 6, wherein the communications canvas is an omnichannel communications canvas.

8. A method comprising:
   receiving a plurality of connectors, each of the plurality of connectors implementing one or more endpoints for aggregating data corresponding to a plurality of applications into a connection resource accessible via a plurality of server-side Application Programming Interfaces (APIs)), each of the plurality of connectors having a type that indicates a type of mapping for integrating user profile data between a communication platform and one or more external systems, wherein the type of mapping defines how to map incoming communications to user profiles, create new user profiles, update existing user profiles, and search for users based on input parameters;

generating a schema definition from the plurality of server-side APIs, each of the plurality of server-side APIs corresponding to a different server-side data store of a plurality of server-side data stores, the schema definition defining a hierarchy of supported types, the hierarchy of supported types including one or more custom object types, each of the one or more custom object types having a plurality of fields, providing the schema definition to a client system;

receiving at least a portion of a query from the client system, the at least the portion of the query built according to the schema definition, the at least the portion of the query specifying a custom object type of the one or more custom object types;

determining to resolve a first field of the plurality of fields corresponding to the specified custom object type using a data item stored in a first server-side data store of the plurality of server-side data stores, the determining to resolve the first field based on an accessing of a first server-side resolver, the first server-side resolver associated with the first field;

determining to resolve a second field of the plurality of fields corresponding to the specified custom object type using a data item stored in a second server-side data store of the plurality of server-side data stores, the determining to resolve the second field based on an accessing of a second server-side resolver, the second server-side resolver associated with the second field; and aggregating the data item stored in the first server-side data store with the data item stored in the second server-side data store into the connection resource for including in a response to the at least the portion of the query for sending to the client system, the aggregating performed using the one or more endpoints corresponding to the plurality of connectors.

9. The method of claim 8, wherein the one or more custom object types includes a timeline object type.

10. The method of claim 8, wherein the one or more custom object types includes a user object type.

11. The method of claim 8, wherein a first data store of the plurality of data stores corresponds to a timeline object and a second data store of the plurality of data stores corresponds to a user object.

12. The method of claim 8, further comprising hydrating one or more user interface elements in real time with the resolved first field and resolved second field.

13. The method of claim 12, wherein the one or more user interface elements are included in a communications canvas.

14. The method of claim 13, wherein the communications canvas is an omnichannel communications canvas.

15. A non-transitory computer-readable storage medium storing a set of instructions that, when executed by one or more computer processors, causes the one or more computer processors to perform operations, the operations comprising:

receiving a plurality of connectors, each of the plurality of connectors implementing one or more endpoints for aggregating data corresponding to a plurality of applications into a connection resource accessible via a plurality of server-side Application Programming Interfaces (APIs)), each of the plurality of connectors having a type that indicates a type of mapping for integrating user profile data between a communication platform and one or more external systems, wherein the type of mapping defines how to map incoming communications to user profiles, create new user profiles, update existing user profiles, and search for users based on input parameters:

generating a schema definition from the plurality of server-side APIs, each of the plurality of server-side APIs corresponding to a different server-side data store of a plurality of server-side data stores, the schema definition defining a hierarchy of supported types, the hierarchy of supported types including one or more custom object types, each of the one or more custom object types having a plurality of fields;

providing the schema definition to a client system;

receiving at least a portion of a query from the client system, the at least the portion of the query built according to the schema definition, the at least the portion of the query specifying a custom object type of the one or more custom object types;

determining to resolve a first field of the plurality of fields corresponding to the specified custom object type using a data item stored in a first server-side data store of the plurality of server-side data stores, the determining to resolve the first field based on an accessing of a first server-side resolver, the first server-side resolver associated with the first field;

determining to resolve a second field of the plurality of fields corresponding to the specified custom object type using a data item stored in a second server-side data store of the plurality of server-side data stores, the determining to resolve the second field based on an accessing of a second server-side resolver, the second server-side resolver associated with the second field; and aggregating the data item stored in the first server-side data store with the data item stored in the second server-side data store into the connection resource for including in a response to the at least the portion of the query for sending to the client system, the aggregating performed using the one or more endpoints corresponding to the plurality of connectors.

16. The non-transitory computer-readable storage medium of claim 15, wherein the one or more custom object types includes a timeline object type.

17. The non-transitory computer-readable storage medium of claim 15, wherein the one or more custom object types includes a user object type.

18. The non-transitory computer-readable storage medium of claim 15, wherein a first data store of the plurality of data stores corresponds to a timeline object and a second data store of the plurality of data stores corresponds to a user object.

19. The non-transitory computer-readable storage medium of claim 15, further comprising hydrating one or more user interface elements in real time with the resolved first field and resolved second field.

20. The non-transitory computer-readable storage medium of claim 19, wherein the one or more user interface elements are included in a communications canvas.

* * * * *